US009292609B2

(12) United States Patent
Baluja et al.

(10) Patent No.: US 9,292,609 B2
(45) Date of Patent: *Mar. 22, 2016

(54) PREDICTIVE INFORMATION RETRIEVAL

(71) Applicant: Google Inc., Mountain View, CA (US)

(72) Inventors: Shumeet Baluja, Leesburg, VA (US); Henry Allan Rowley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,994

(22) Filed: May 20, 2014

(65) Prior Publication Data
US 2014/0258263 A1    Sep. 11, 2014

Related U.S. Application Data

(63) Continuation of application No. 13/615,791, filed on Sep. 14, 2012, now Pat. No. 8,768,958, which is a continuation of application No. 11/004,499, filed on Dec. 3, 2004, now abandoned.

(51) Int. Cl.
*G06F 17/30*    (2006.01)

(52) U.S. Cl.
CPC .... *G06F 17/30867* (2013.01); *G06F 17/30864* (2013.01); *G06F 17/30882* (2013.01)

(58) Field of Classification Search
USPC ................ 707/722, 759, 758, 765, 766, 767, 707/999.003–999.005, 770; 709/218, 223
See application file for complete search history.

(56) References Cited

U.S. PATENT DOCUMENTS

| | | | |
|---|---|---|---|
| 5,758,087 A | 5/1998 | Aaker et al. | |
| 5,802,292 A | 9/1998 | Mogul | |
| 5,832,231 A | 11/1998 | Raman et al. | |
| 5,878,223 A | 3/1999 | Becker et al. | |
| 6,006,225 A | 12/1999 | Bowman et al. | |
| 6,067,565 A | 5/2000 | Horvitz | |
| 6,182,133 B1 * | 1/2001 | Horvitz | 709/223 |
| 6,347,312 B1 | 2/2002 | Byrne et al. | |
| 6,539,382 B1 | 3/2003 | Byrne et al. | |

(Continued)

FOREIGN PATENT DOCUMENTS

EP    1 304 628    4/2003
JP    10-154154    6/1998

(Continued)

OTHER PUBLICATIONS

Australian Government: IP Australia Amendment in Application No. AU 2005314576, mailed Apr. 30, 2009, 2 pages.

(Continued)

*Primary Examiner* — Hung T Vy
(74) *Attorney, Agent, or Firm* — Fish & Richardson P.C.

(57) ABSTRACT

A computer-implemented method for generating results for a client-requested query involves receiving a query produced by a client communication device, generating a result for the query in response to reception of the query, determining one or more predictive follow-up requests before receiving an actual follow-up request from the client device, and initiating retrieval of information associated with the one or more predictive follow-up requests, and transmitting at least part of the result to the client device, and then transmitting to the client device at least part of the information associated with the one or more predictive follow-up requests.

19 Claims, 9 Drawing Sheets

(56) References Cited

U.S. PATENT DOCUMENTS

| | | | |
|---|---|---|---|
| 6,564,213 | B1 | 5/2003 | Ortega et al. |
| 6,757,255 | B1 | 6/2004 | Aoki et al. |
| 6,876,997 | B1* | 4/2005 | Rorex et al. |
| 6,981,017 | B1 | 12/2005 | Kasriel et al. |
| 6,993,586 | B2 | 1/2006 | Chen et al. |
| 6,993,591 | B1 | 1/2006 | Klemm |
| 7,089,331 | B1 | 8/2006 | Gollapudi et al. |
| 7,383,203 | B1* | 6/2008 | Feldstein ............... G06Q 30/02 705/14.67 |
| 7,389,284 | B1 | 6/2008 | Surlaker et al. |
| 7,444,327 | B2* | 10/2008 | Watson ............ G06F 17/30648 |
| 7,610,351 | B1 | 10/2009 | Gollapudi et al. |
| 2002/0052873 | A1* | 5/2002 | Delgado et al. ................... 707/7 |
| 2002/0078165 | A1 | 6/2002 | Genty et al. |
| 2002/0116472 | A1* | 8/2002 | Kalish et al. .................. 709/218 |
| 2003/0037050 | A1 | 2/2003 | Monteverde |
| 2003/0146939 | A1 | 8/2003 | Petropoulos et al. |
| 2004/0220925 | A1 | 11/2004 | Liu et al. |
| 2004/0260577 | A1* | 12/2004 | Dahlin et al. ..................... 705/2 |
| 2005/0125390 | A1 | 6/2005 | Hurst-Hiller et al. |
| 2005/0234972 | A1 | 10/2005 | Zeng et al. |
| 2005/0283468 | A1 | 12/2005 | Kamvar et al. |
| 2006/0026013 | A1 | 2/2006 | Kraft |
| 2006/0085766 | A1* | 4/2006 | Dominowska et al. ....... 715/854 |
| 2012/0158685 | A1 | 6/2012 | White et al. |

FOREIGN PATENT DOCUMENTS

| | | |
|---|---|---|
| TW | 511349 | 11/2002 |
| TW | 536894 | 6/2003 |

OTHER PUBLICATIONS

European Official Action in Application No. EP05 823 145.7-2201, dated Feb. 18, 2011, 5 pages.
Preliminary Examination Report in Application No. TW094138389, dated May 10, 2012, 14 pages.
Canadian Official Action in Application No. CA2,589,365, dated Aug. 24, 2012, 2 pages.
Preliminary Examination Report in Application No. TW094138389, dated Dec. 25, 2012, 13 pages.
International Search Report and Written Opinion in International Application n No. PCT/US2005/040387, mailed Apr. 11, 2006, 10 pages.
International Preliminary Report on Patentability in International Application No. PCT/US2005/040387, mailed Jun. 14, 2007, 7 pages.

* cited by examiner

PREDICTIVE INFORMATION RETRIEVAL

CROSS-REFERENCE TO RELATED APPLICATIONS

This application is a continuation application of and claims priority to U.S. application Ser. No. 13/615,791, filed on Sep. 14, 2012, and issued as U.S. Pat. No. 8,768,958, which claims priority to U.S. application Ser. No. 11/004,499, filed on Dec. 3, 2004, the entire contents of which are hereby incorporated by reference.

TECHNICAL FIELD

The invention relates to assisting users of computing or communication devices in obtaining information, and more particularly to providing information quickly even where the communication medium is bandwidth limited.

BACKGROUND

As the speed of computing devices has increased, so have the demands that users of the devices place on them. While simple textual presentation was acceptable in the past, users now expect full-color, and full-motion data. Such content delivery is relatively simple for moving data from local storage (e.g., a hard disk drive) on a machine to the display apparatus of the machine, such as over a local bus.

Data transfer between heterogenous devices or over data paths having constrained bandwidth is much more complicated. Because the devices are heterogenous, or not closely matched, they generally must communicate over a standardized industry-wide protocol that may include features that degrade possible performance in an effort to permit interoperability. In a wired environment, induction within long wires can interfere with a clean transfer of digital signals. In a wireless environment, even more difficulties arise, and include limited allowable bandwidth which limits the amount of information that can be transferred even under theoretically perfect conditions. Moreover, interference (e.g., from other broadcasting devices or from ambient conditions such as solar interference) can degrade the bandwidth of the wireless communication channels. As a result, data transmission, and particularly wireless transmission (such as through 802.11 or cellular network transmission) always seems to lag user demand by a large amount. In addition to slow transmission speeds, certain networks, such as cellular telephone networks, require initial connection times that add even more delay.

Slow transmission speeds can be particularly annoying for real-time operations such as on-line searching and browsing on the internet. In particular, for such searching and browsing, information flow is highly asymmetrical, as user requests are small, but data transfer down to the user is very large.

For example, a user might click on a link so as to send a short internet address to a server, and may be provided a very long response that includes color graphics and applets for a web page. The user may also perform a search and be provided with a number of search results (preferably in a form that does not require much bandwidth, such as the standard Google search pages). The user may then want to access the web pages for each of the search results until the desired result is located. However, for a device such as a cellular telephone that might not have adequate bandwidth, the user may be forced to spend as much time or more time waiting for information as the user spends reviewing the information.

Thus, there is a need for a system that can provide a user with more immediate access to requested data even over a restricted communications path such as a wireless communications path.

SUMMARY

A computer-implemented method and system are disclosed to provide predictive information so that the information can be downloaded to a user's device before the user makes an explicit request for the information. As a result, the user will not need to wait for the download to occur once they make an explicit request for the information.

In one embodiment, a computer-implemented method for generating results for a client-requested query is disclosed. The method comprises receiving a query produced by a client communication device, generating a result for the query in response to reception of the query, determining one or more predictive follow-up requests before receiving an actual follow-up request from the client device, and initiating retrieval of information associated with the one or more predictive follow-up requests. The method may also involve transmitting at least part of the result to the client device, and then transmitting to the client device at least part of the information associated with the one or more predictive follow-up requests. The query may comprise a search request, and the result may comprise data for generating a plurality of hyperlinks to information relating to the query. The predictive follow-up requests may also be determined by identifying the targets of the hyperlinks, or by identifying searching services available to the user. The searching services may include web searching, shopping searching, news searching, or image searching, or a combination of those services.

In some embodiments, a pre-established number of predictive follow-up requests is determined. Also, a maximum transfer size may be computed as a function of a connection speed (predicted or measured) for the client communication device, and information associated with the one or more predictive follow-up requests will not be transmitted or its transmission will be delayed relative to other predictive follow-up requests if it exceeds the maximum transfer size. The predictive follow-up requests may also be determined as a function of search term correlation for a plurality of clients.

In another embodiment, advertising matches for the predictive follow-up requests may be identified before an actual follow-up request from the client device is received.

In yet another embodiment, a computer-based data collection and distribution system is disclosed, and comprises a request processor to receive data requests from one or more remote clients, a response generator to identify and present information responsive to the data requests, a request predicting module to determine one or more predictive follow-up requests representative of likely requests to be made subsequently by a user of the remote client, and an interface to provide the information responsive to the data requests and information responsive to the one or more predictive follow-up requests without the need for an actual follow-up request. The response generator may comprise an internet search engine, and the information responsive to the data requests may comprise hyperlink information.

In some embodiments, the predictive follow-up requests may comprise information at locations associated with the hyperlink information, and the predictive follow-up requests may comprise requests for a plurality of search types, such as web search, news search, shopping search, image search, blog search, or news group search. In addition, an advertising selector may be provided to identify advertising content associated with the predictive follow-up requests before a follow-up request is made.

In yet another embodiment, a computer-implemented data collection and distribution system is disclosed and comprises a request processor to receive data requests from one or more remote clients, a response generator to identify and present information responsive to the data requests, means for determining one or more predictive follow-up requests representative of likely requests to be made subsequently by a user of the remote client, and an interface to provide the information responsive to the data requests and information responsive to the one or more predictive follow-up requests without the need for an actual follow-up request.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION

The systems and techniques described here relate to assistance with information retrieval on a device having limited bandwidth. The systems can take many forms, including personal communicators and personal computers. The data may also be entered in many forms, including by telephone keypad and voice. In general, the systems operate by identifying information that a user is likely to request in the future (predictive information), for example, based on requests the user has made in the past. The selection of predictive information may be based only on requests by the user, or on a combination of the requests and other information, such as recent activity by other users of the systems.

Advantageously, the systems and techniques may allow users to review information while their devices are receiving or gathering additional information in the background. In this manner, when the user is finished reviewing the initial information and chooses to review additional information, that additional information may have already been downloaded to their device and they may not have to wait a long time for the information to be presented. The predictive retrieval may be defined by the user so as to be personalized, and may also be made dynamic so as to match the user's likely preferences more closely.

Figure 1:
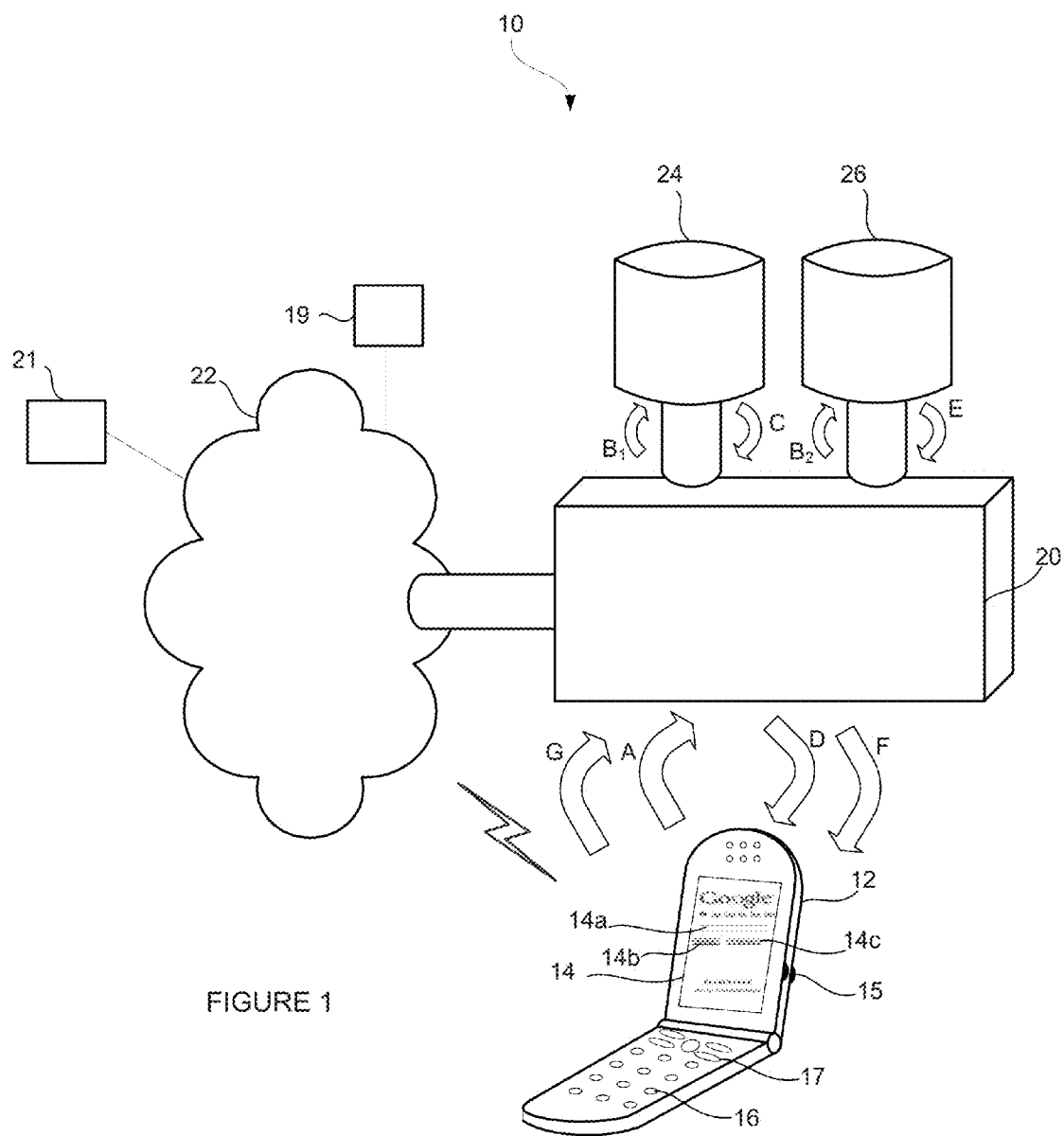
FIG. 1 shows schematically a data entry system having predictive data flows between elements in the system.

FIG. 1 shows schematically a data entry system 10 having predictive data flows between elements in the system. The system 10 includes a device 12, shown as a cellular telephone handset for communicating with a user, but could take any appropriate form, such as a personal digital assistant, a personal computer, or a voice-driven communication device. In this embodiment, the device 12 has a display screen 14 that can be programmed to display any appropriate information to a user of the device 12. For example, the display screen 14 could display information related to an Internet searching application, such as a search box 14a and related control buttons.

As shown, search box 14a may simply be a contrasting area on the screen that displays a search term as it is entered by the user. Search button 14b may submit the contents of search box 14a to a search engine, such as a search engine connected to the cellular network by the internet. The display screen 14 may then display the results of the search. Alternatively, "I'm Feeling Lucky" button 14c may submit the search results, and the display screen 14 may then immediately display the page for the most appropriate match for the search.

Data may be entered into device 12 in any of a number of manners. Specifically, data entry keys 16 may be used to enter information such as alphanumeric characters, and may take the form of a standard telephone keypad, with alphabetic characters on the 2 through 9 keys. Other appropriate ways of entering alphanumeric information, including voice recognition, may also be used. As used here, references to entry of text encompass entry through a keyboard or by writing, and also other manners of data entry, such as by speaking to a voice-recognition enabled system.

In addition, control keys 17 may be provided, for example, to perform predetermined functions or programmed functions, or to control icons on display screen 14. Control keys 17 may also be used as supplemental keys, i.e., the number 0 could represent things other than 0, the "#" key may be used as a space key, the "*" key may be a proxy for the backspace key, and the "1" key may represent punctuation.

Also, control wheel 15 may be provided on the side of the handset to allow a user to scroll through selections shown on display screen 14, and to push inward to click on a desired selection. Other appropriate data presentation and data entry features may also be provided, particularly where the system 10 includes a full-sized personal computer, or where the system operates via voice control.

Device 12 may obtain the information the user needs through network 22, which may be a single network or combination of networks. Thus, for example, device 12 could communicate through a cellular telephone network using a WAP standard or other appropriate communications protocol. The telephone network could in turn communicate with the internet, either directly or through another network.

A search system 20 may also communicate with the network 22 so as to receive requests from device 12 and locate information to return to device 12. The search system 20 may take any applicable form, and may be, for example, a system such as that provided by Google. Among other components associated with search system 20 (which are described in more detail with respect to FIG. 2), there is an index database 24 and a cached information database 26. The index database 24 contains data that represent searchable information available to the search system 20. For example, the search system 20 may scan the internet or intranets (for organization-specific information) for content such as web sites or workgroup discussions, may extract key words and other objects from the content, and may organize the information in a manner that permits ready searching. The index database 24 may also generate other information from the content, such as indicators of how certain web sites link to other web sites, so as to allow for a system such as the Google Page Rank system.

The cached information database 26 contains copies or substantial copies of content that the system 20 locates. For example, the cached information database 26 may contain web pages or portions of web pages (e.g., only textual, or only non-video content). In this manner, a user who accesses system 20 may request the cached information rather than making direct connection with the content provider, such as when the content provider is inaccessible, has changed the content since it was cached, or when the connection to the content provided is substantially slower than that to the search system 20.

The system 10 may also include other nodes 19, 21 connected to the network 22. These nodes 19, 21 could include any sort of device or devices capable of communicating with or over the network 22. For example, node 19 could be a web server that is capable of delivering content in response to requests by users, such as a user of device 12. As another example, node 21 could be an e-mail server that may be accessed by device 12, or could be a pass-through server for an e-mail delivery service (e.g., Research in Motion).

Lettered arrows in FIG. 1 show an exemplary flow of information relating to the provision of a response to a request from device 12, along with the provision of predictive information to device 12. Arrow A shows an initial request sent by device 12, which in this example is a search request. Although the request passes through network 22 (and other components that are not pictured), it is directed at search system 20. Search system 20 then receives the request and applies it to a search process, such as by parsing the request, locating content in index database 24 (see Arrow B1) that contains terms from the request, and ranking the matches by some predetermined method such as the Page Rank method after receiving index information back from the index database 24 (see Arrow C).

The search system 20 may then organize this information and transmit it back to the device 12 through network 22 as a search result (see Arrow D). For example, the returned information may include HTML code, XML messages, WAP code, Java applets, xhtml, plain text, voiceXML, VoxML, VXML, etc., that causes the device 12 to generate a display of information such as descriptions of web sites that contain information responsive to the search, along with hyperlinks directed toward those sites.

Before the user acts on the returned information, the system 10 may also begin gathering additional information that the user may request in the near future. For example, the system 10 may, at or near the same time it is transmitting the information relating to the search results, analyze those results to begin downloading information from the sites. The information may be obtained from the cached information database 26 (Arrows B2, E) or from nodes 19, 21 over network 22. As one example, where the search result is a list of web site addresses employed to provide the user with hyperlinks, the system 10 may access those web sites, gather information from them, and pass the information on to device 12, where it can be stored until the user clicks on one of the links they were provided in response to the search request.

In this manner, the follow-up requests by the user can be responded to almost instantly, as the information responsive to the request has already trickled into the memory of the device 12 while the user was reviewing the results. As a result, the limited bandwidth available to device 12 can be spread over time periods of non-use so that the user can access information quickly from, e.g., local memory, and need not access it over a more constrained-bandwidth channel.

Other modes of predictive information retrieval may also be executed, in addition to gathering information from web sites identified in response to a search request. For example, where multiple search styles are associated with each other, the results for a selected search style may first be delivered, and the results for the other search styles may be transmitted in the background. The search styles may be, for example, the Google searches on the web, for images, for news, for newsgroups, for web log (blog) sites, or for product pricing and information (e.g., Froogle). Other such information can include definitions of search terms, telephone directory or mapping information, search results for a localized area, video clips, audio clips, streaming files, television listings, and blogs.

This approach is beneficial because users can be expected to select other available search styles, or search services, after they have reviewed the initial search results. Also, a user might conduct the initial search using the wrong style, and then upon discovering the mistake, select a different search style. In these situations, the follow up information would be more readily available to the user, such as when the user selects the relevant on-screen tab for a different search style. The results can thus be presented almost instantaneously, rather than making the user wait for additional connections and/or downloading.

Predictive results may also be generated by associating the user's search (or other) request with highly related requests. For example, the system 10 may look at statistics aggregated across multiple users, so as to determine, for example, that users who enter the search term "A" often also search for "X," "Y," and "Z." For example, people who query "coffee" may frequently also query "Starbucks," so when a particular user enters "coffee" as a search, the system may pre-fetch results for the search term "Starbucks" while the device is displaying to the user the results of a search on "coffee." Then, if the user acts consistently with his or her peer group, the follow-up information is nearly immediately accessible.

The follow-up information is generally stored in the memory of the device 12 for viewing if the user requests it. If a user does not end up viewing the follow-up information, it can be purged, for example, after a pre-set time or after other information has been retrieved. For example, a portion of memory may be reserved for the predictive information and may be treated as a first-in-first-out (FIFO) style of memory. The memory may also be purged each time a user conducts a new search or information request, or each time the user accesses a particular application such as a search application.

The number of follow-up results to obtain can be determined in a number of ways. For example, the number may be statically set, such as the top five related queries. It can also be set as a function of the amount of memory in device 12, so that the memory does not overflow. In addition, it can be set as a function of predetermined or computed bandwidth of the device, so that the follow up information can be expected to be downloaded to the device in a particular appropriate time period. Other appropriate techniques for limiting the amount of follow up information may also be provided.

Where the follow up information includes information that would be retrieved from the user clicking on links in the search results, the depth of retrieval may also be established. For example, the system may be set to retrieve the information at the main web site, along with web pages that are one or two levels deep below the main web page. The depth of retrieval may also be a function of device 12 memory or system bandwidth. It could also be a function of the system's observed activity for the user or group of users, such that a user who does not go deeply into sites will not be provided with much depth in the pre-fetched results, or a site for which visitors in the aggregate have not gone very deep will also not have much depth for pre-fetched results.

Also, the system may prioritize the information retrieval, such that, for example, it retrieves text before graphics, or does not retrieve graphics at all as part of the pre-fetching operation to obtain predictive information. In such a situation, the graphical information could be retrieved after the user actually selects the particular link. In this manner, the amount of pre-fetched information can be kept at a minimum, and the user can ultimately see all the information, but may have the text to review immediately (because it has been pre-fetched) while the graphics download.

The retrieval prioritization may also be addressed by search result. For example, if statistics indicate that 30% of users click on "Starbucks" when it is presented, and only 0.5% of users click on "CoffeeReview," then the system could prioritize the retrieval of predictive information for Starbucks over that for CoffeeReview. As another example, low bandwidth follow up information (such as newsgroup text) may be transmitted first, followed by more high bandwidth information (such as images), so as to maximize the amount of useful information that is pre-fetched.

In addition, relevant advertising may also be downloaded either before, after, or interleaved with, the remaining downloaded information, and may include, for example, results from an advertising program such as the well known Google Adwords program. The identified advertisements may be related to the search term, as is commonly performed. Alternatively, or in addition, the advertising may be generated, not on the search itself, but on the predictive information generated by the system.

In this manner, the system may also deliver predictive advertising, either immediately so as to better anticipate the type of information as an input in which the user will be interested, or by pre-fetching the advertising information so that it may be immediately displayed when the user makes a new selection (e.g., when the pre-fetched follow-up information is displayed). Standard methods of identifying the appropriate advertising may be used, and may simply be passed the predictive information rather than the initial information entered by the user. The advertising could also be delivered, and/or displayed, apart from any predictive or follow-up information. In this manner, the advertising that is delivered may be made more flexible and relevant to the user, whether it is accompanied by predictive information retrieval or not.

The predictive information retrieval process may be accomplished in the system 10 by search system 20, by device 12, or by cooperation of search system 20 and device 12. For example, device 12 may be programmed with code that, when executed, analyzes results from a search request and then begins accessing information from the sites identified by the results while the user is still reviewing the results. Also, the device 12 may be programmed with code that, when executed, conducts multiple search styles or types, returning results of the first search type immediately, and returning results of the other search types in the background while the user reviews the initial results.

The search system 20 may also take on the task of acquiring and managing follow-up information, so that the device 12 need only receive the information, store it, and present it. For example, where the predictive information retrieval mode relates to search styles (e.g., news, webgroups, blogs, images, and shopping), the search system 20 may be set to start delivering the follow-up results automatically because the search system 20 already has all the information that it needs in order to do so.

In contrast, where the retrieval mode relates to acquisition of web content from target sites of a search result, the device 12 rather than the search system 20 may be a better candidate for the follow-up retrieval (so that the web content need not pass through the search system 20, but may instead be acquired directly by the device 12). Also, the search system 20 could provide commands to the device 12 in such a manner that the device 12 acquires the follow up information directly from third parties, but under the influence of search system 20.

The information flow shown in FIG. 1 may take place asynchronously, so that, as the initial results are being transmitted to the device 12, additional predictive results are being located by system 10. Transmission of the predictive results may then begin, and acquisition of additional predictive information may happen at the same time. Coordination of the information flows and passing of messages may occur in any appropriate and well known manner.

Follow-up actions by the user may also create an interrupt in the flow shown in FIG. 1. For example, a user may select a result from an initial information response while follow up information is still being gathered by the device 12. In that situation, the user's action may interrupt the ongoing download of predictive information (indicated by Arrow F). The new results for the second request may then begin downloading to the device 12, and the search system 20 can begin identifying and gathering predictive information for the second request. The search system 20 can then begin downloading that new predictive information in a similar manner to that for downloading the predictive information for the first request.

The previously downloaded predictive information may be purged at this point, may be pushed out as necessary by the new information (such as in a FIFO system), or may be stored for later use. For example, when predictive information for the second request has fully downloaded, the system 10 may return to downloading the remaining predictive information for the first search. In this manner, if the user returns to the original request (as users are known to do), their further selections can be made with immediate response from the system 10.

Figure 7A:
FIGS. 7a-7c are exemplary screen shots showing the operation of predictive information retrieval apparatuses.
Figure 7B:
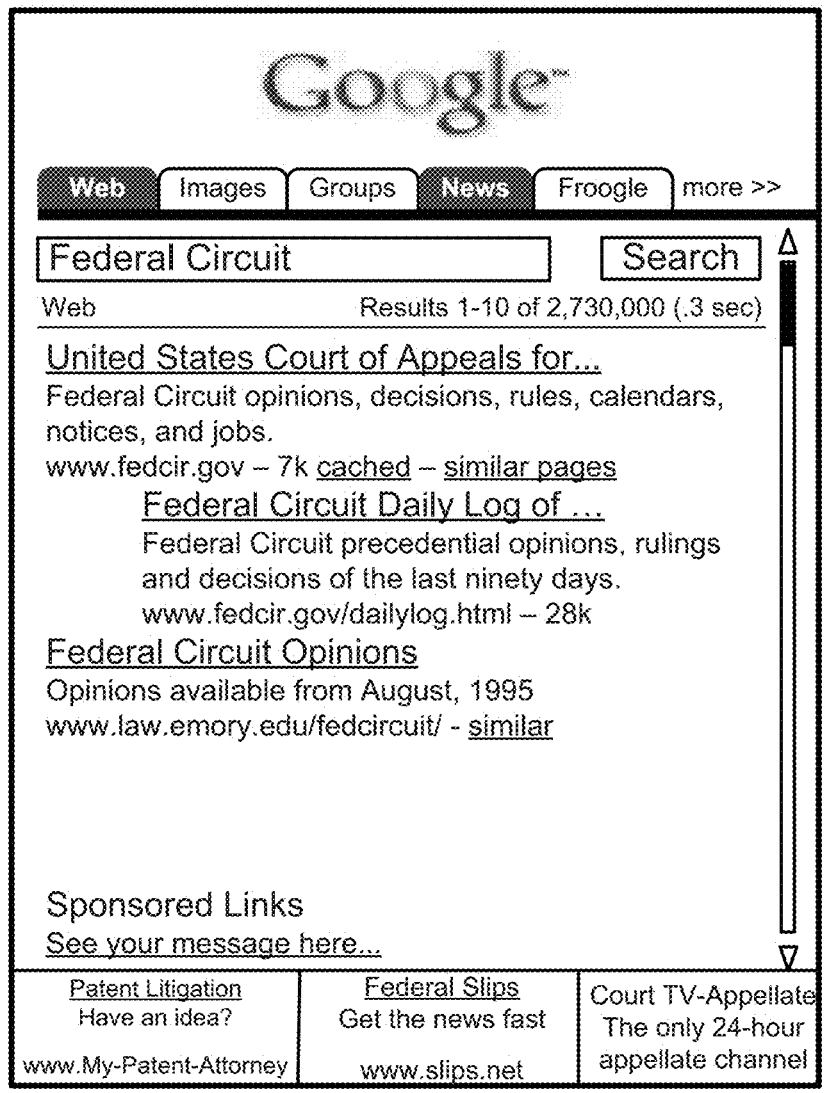
Figure 7C:
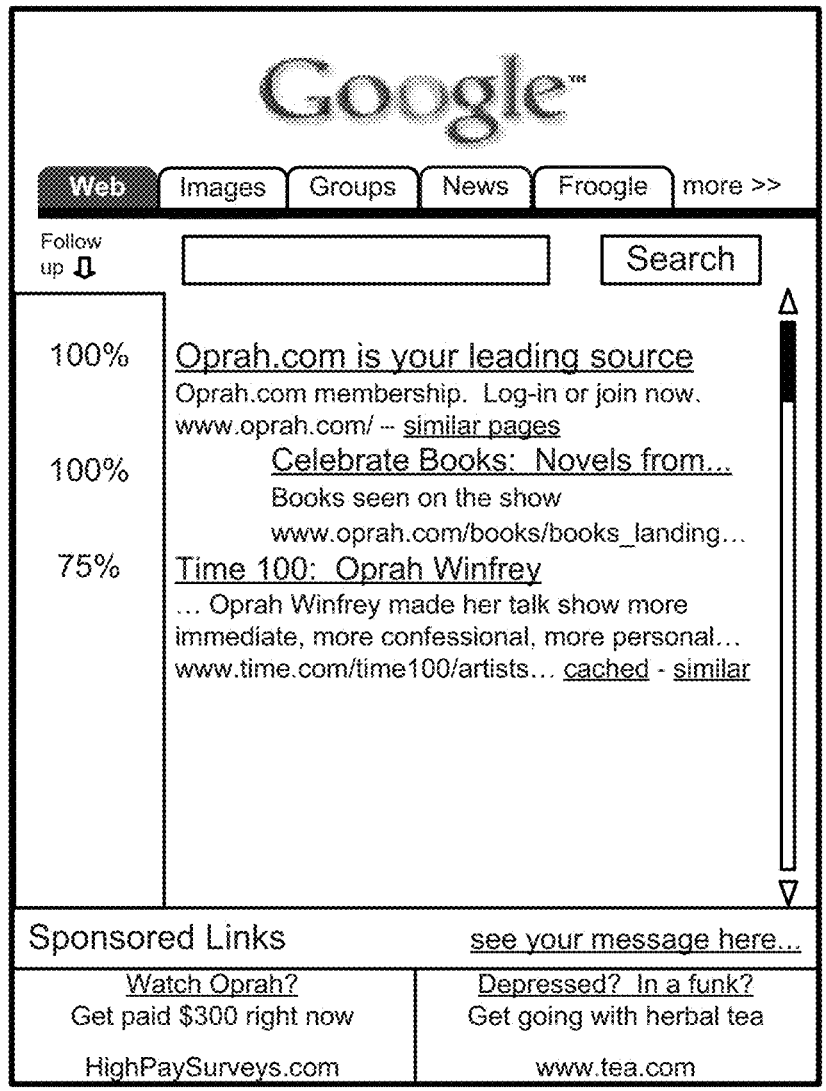

In addition, appropriate visual, audio, or tactile indicators may also be provided to the user as a guide to let the user know when follow up information has been loaded and they can request it and receive it immediately, as is shown in more detail with respect to FIGS. 7a-7c.

The system 10 can also be customized for a particular user, either individually or as a member of a group. For example, a user could be provided with options on device 12 or on another device such as a personal computer running a browser application, with a template for selecting preferred parameters for the provision of predictive information. For example, the user may establish the amount of memory to be used to store predictive information on the device 12, may establish a default information retrieval mode, may set a preferred order for downloading information (e.g., news before newgroups, or news before web), may restrict the downloading of certain results such as shopping results, or may download news in order (e.g., chronologically or reverse-chronologically). This customization may also be provided as a much broader customization session by which the user could set many other parameters that affect the information retrieval experience for the user when using device 12.

The customization may be made more automated through the use of profiles. For example, a teenage user may have no interest in news, but a very high interest in shopping, so news could be demoted and be collected last for their telephone. As a result, that person could select a "teen" profile that would cause a number of parameters to be set in a manner that is believed to be preferred by teens. The user may then edit the pre-set parameters. Also, when the predictive information is based on aggregated search statistics or correlation between a search term and other terms used by other users in similar circumstance, the statistics for only a subgroup (e.g., teens, seniors, sports fanatics, etc.) may be analyzed. Also, an organization such as a business could establish a default profile (which could include items well beyond predictive information retrieval parameters) for its employees, such as if the organization contracts with a wireless information provider to outfit all its employees with a particular kind of device. Profiles could also be prepared for specified subsets of users (e.g., sales, executive, etc.)

Also, while the system 10 is shown as working with a wireless communication device 12 such as a cellular telephone, it could provide benefits in many other environments, particularly where bandwidth is limited. For example, a wireless system installed in an automobile could also benefit from such predictive information retrieval. A personal computer or other form of computer, even with a supposed broadband connection, could also benefit where the information to be retrieved is large relative to the amount of bandwidth. Even where the information is not much larger than the available bandwidth, delays in gaining access to information can be annoying to a user, and can interfere with the flow of the user's work, particularly if the delays are repeated many times. Thus, the predictive information retrieval as described can have benefits in a broad array of applications.

Other benefits may be achieved in broadband environments. For example, news video clips may be predictively downloaded to a user based on predictive selections by the system 10, and may include clips of various recent news items for the day. The user may then be able to watch all of the clips (or prepare an aggregate personalized newscast either automatically or manually) without download delay.

Figure 2:
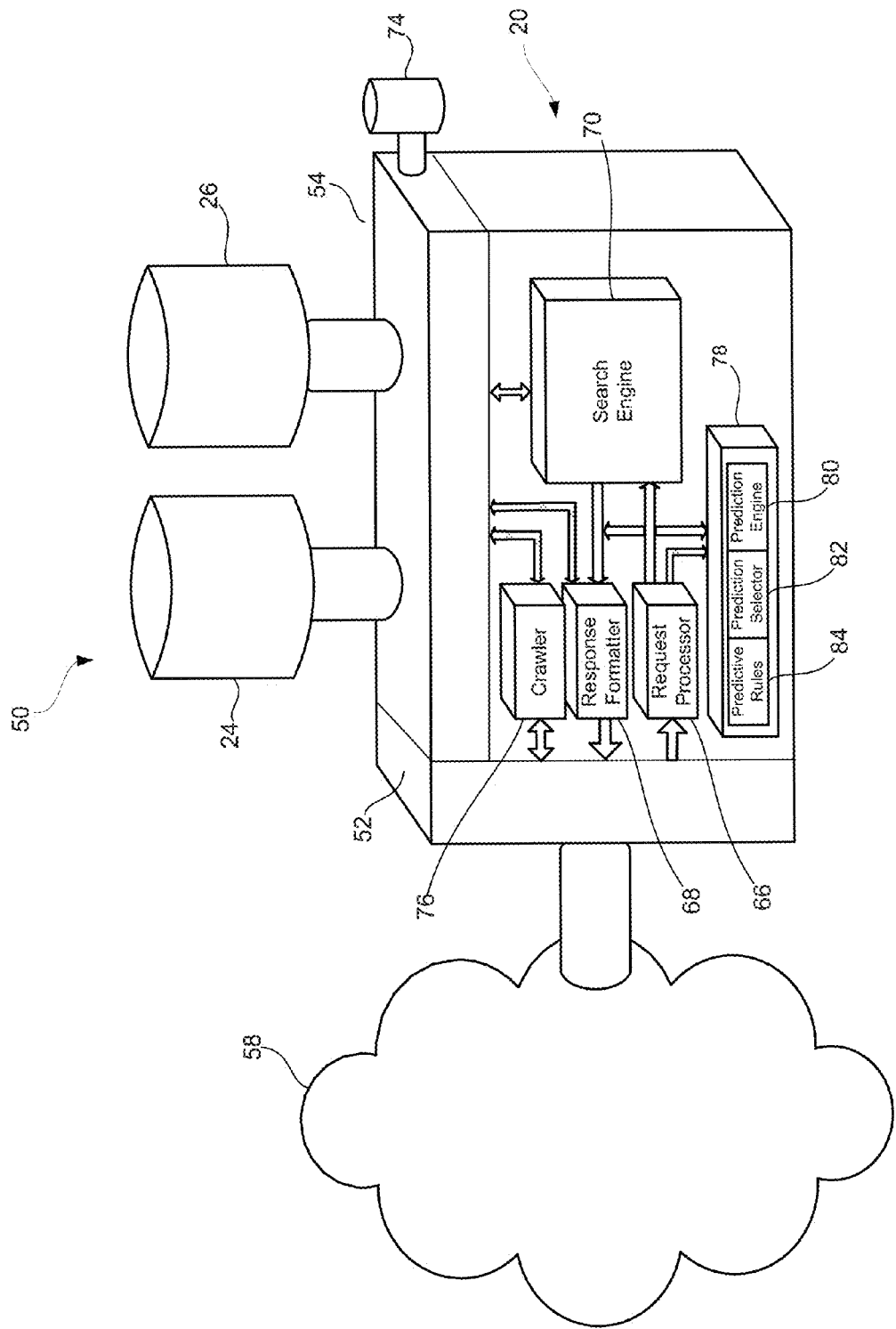
FIG. 2 is a schematic diagram of a system to receive requests, generate responses to the requests, and generate predictive responses for future requests.

FIG. 2 is a schematic diagram of a search system 20 to receive requests, generate responses to the requests, and generate predictive responses for future requests. Search system 20 is connected to a network 58, such as the internet, so as to be able to communicate with users who may be interested in accessing the services provided by search system 20. Search system 20 may be broken into multiple separate systems to allow for scalability, and may be connected to network 58 in any of a variety of ways, as is commonly known.

Search system 20 may also include an index database 24 and a cached information database 26. These databases may be connected to search system 20, for example, by a high bandwidth LAN or WAN, or could also be connected to the search system 20 through network 58. The databases may also be split up so that they are located in multiple locales. As described above, index database 24 generally stores information about items such as web sites which the search system 20 reviews, rather than the web sites themselves so that the search process is faster and more efficient. The cached information database 26 generally stores copies or sub-copies of information about the items searchable by search system 20. In addition, search system 20 may include system storage 74, which stores the various components needed for the general operation of the search system 20, such as applications, system parameters, and information about registered users of the system.

Search system 20 communicates through an internal interface 54 and an external interface 52, which are shown as distinct interfaces, but may be partially or fully combined, or may be represented by additional interfaces. By example, internal interface 54 may comprise interface devices for a high speed, high bandwidth network such as SONET, Infiniband, or Ethernet network cards, or any appropriate communication hardware operating under an appropriate protocol, so that search system 20 can respond to a large number of distinct requests simultaneously. External interface 52 may comprise interface devices for communicating with network 58, such as Ethernet network interface cards (NICs) or other communications devices. The precise design of the system 20 is not critical to the proper operation of the invention, and could take any appropriate form.

Within search system 20, a search engine 70 operates to produce search results in response to search requests from users, employing information stored in index database 24. The information in index database 24 may be gathered by crawler 76, which may continuously or almost continuously obtain new information from sources connected to network 58. Requests, such as search requests from users, may be received through external interface 52 and handled by request processor 66. For example, request processor 66 may parse the requests and reformat them from html/text requests to internally usable search terms/strings. The information generated by search engine 70 in response to a request may also be converted by response formatter 68 in a manner that allows it to be used by the requesting device, such as in a WAP format, HTML document, XML document, VoiceML result, etc., and then transmitted via external interface 52.

Predictive information may be retrieved and/or generated by predictive module 78, which may monitor requests from a user and responses to the user. In this manner, the predictive module 78 is able to begin working as soon as a request is received or a response is delivered. For example, where a web search request is received by the system 20, that request may be processed and forwarded to search engine 70. In addition, the predictive module 78 may recognize the request, and cause additional formatted requests to be forwarded to the search engine (e.g., newgroups searches, image searches, or web blog searches using the same search terms). The predictive module may cause the predictive information that results from those requests to be transmitted to the user's device, for example, using response formatter 68.

The predictive module 78 may include, for example, predictive rules 84, prediction selector 82, and prediction engine 80. The predictive rules 84 may include parameters that may be selected and changed so as to manage the manner in which predictive information is gathered. The rules 84 may be specific to particular users (e.g., in a profile of rules for the user, or with pointers for a user to particular parameters so as to minimize storage space required). For example, the predictive rules 84 for a particular user may indicate that the user prefers not to download images, and that the user's expected bandwidth is a particular value.

Prediction selector 82 controls which prediction mode, of possible options, is used by system 20. For example, prediction selector 82 may direct that other search styles are performed as part of the predictive process, or that web sites relating to hyperlinks returned as part of the initial response are gathered.

Prediction engine 80 applies processes to the predictive rules 84 according to a setting indicated by the prediction selector 82. Prediction engine 80 thereby causes appropriate messages or requests to be provided, for example, to the search engine 70 to retrieve additional search results in different search styles, to direct the user's device to appropriate web sites so that it gathers predictive information directly, or to forward information to the user's device.

The components of predictive module 78 thus cooperate to obtain predictive information relating to, for example, requests from a user so that the user's device can pre-fetch additional information the user is likely to request next. Although the predictive module 78 is shown as having three components as described above, the module 78 may take other appropriate forms, with fewer or more components, and may be integrated into system 20 in a manner other than that specifically shown. Also, similar predictive information services could be provided by a system that is not a search system, but instead allows users to receive other types of information and/or make other types of requests.

Figure 3:
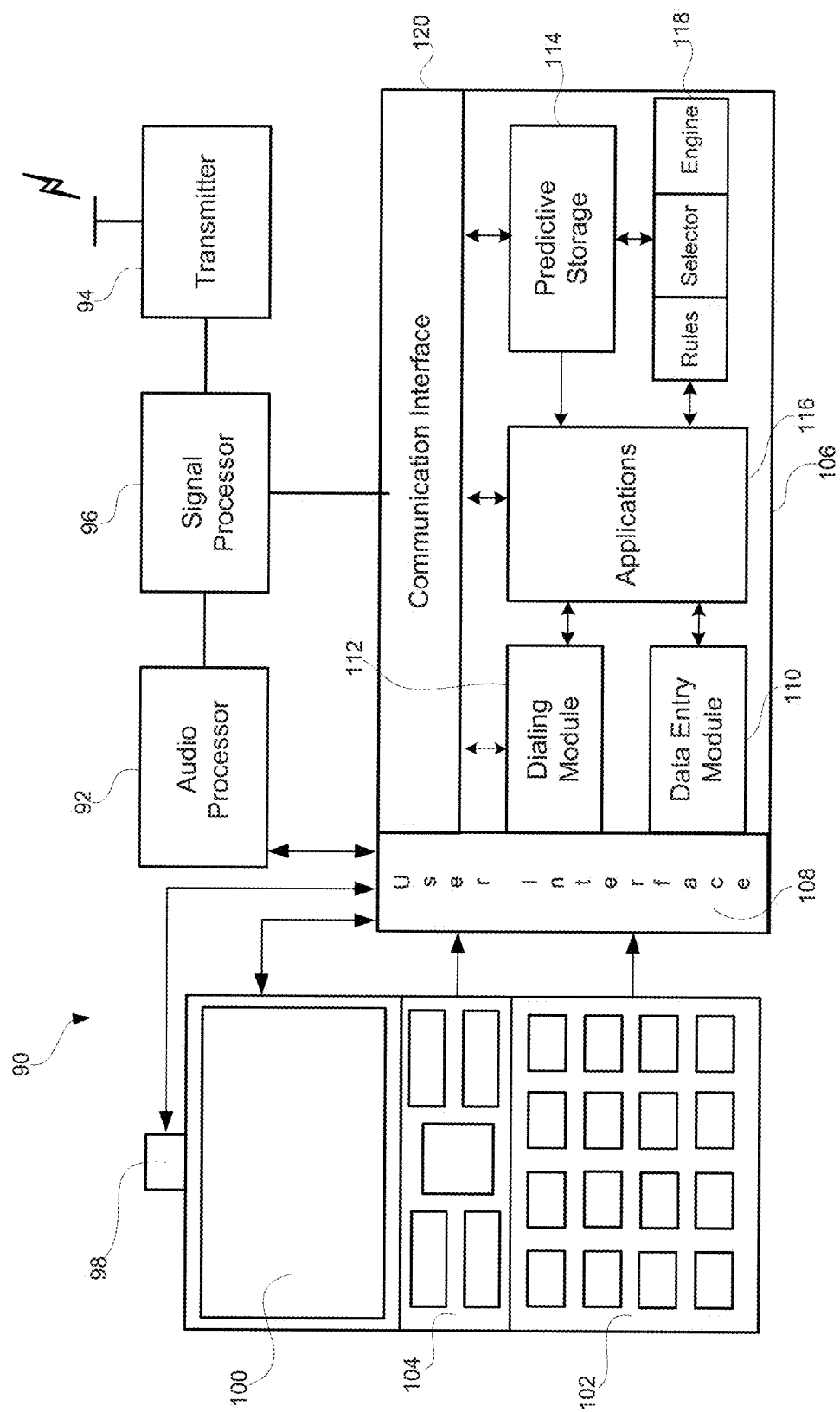
FIG. 3 is a schematic diagram of a wireless communication handset for generating requests and receiving and using information generated in response to those requests.

FIG. 3 is a schematic diagram of a wireless communication handset for generating requests and receiving and using information generated in response to those requests. A communication system 90 may be implemented in a device such as a personal communicator, e.g., a cellular telephone. The system 90 receives and transmits information wirelessly using transmitter 94, with the received signals being passed to signal processor 96, which may comprise digital signal processor (DSP) circuitry and the like. Normal voice communication is routed to or from audio processor 92, which may communicate with speaker/microphone 98, including via user interface 108.

User interface 108 handles all communication with the user of the system 90, including voice, visual, and data entry communication. Visual presentation of information may be provided via display screen 100. General data entry, apart from entered voice data, may occur through keypad 102, which may be arranged as a standard 12-key telephone keypad. The device may also be provided with appropriate control keys 104 for performing necessary control functions. Key pad 102 and control keys 104 may include contact pushbuttons, joysticks, portions of touch-sensitive panels, or other appropriate input devices. Although the communication is shown for clarity as occurring through a single user interface 108, multiple interfaces may be used, and may be combined with other components as necessary.

The system 90 may be provided with a number of computer applications 116, such as games, applications to assist in dialing numbers, and applications to permit web browsing, including the entry of data as part of the web browsing. The applications 116 may be stored in ROM, Flash memory, RAM, MRAM, or otherwise, as appropriate, and may be accessed by the system 90 as needed. A dialing module 112 may provide standard dialing functionality for the system, receiving entered dialing digits or voice dialing instructions through interface 108, and providing appropriate dialing signals through transmitter 94 using communication interface 120.

A data entry module 110 receives data other than dialing instructions, such as search data entered into the system 90. The data entry module 110 may provide the entered data directly to an application 116, or may employ a predictive module 118 to help gather additional predictive information before a user requests it. The predictive module 118 may comprise predictive rules 123, a prediction selector 121, and a prediction engine 122. These three components may work in a similar manner to those discussed with respect to search system 20 in FIG. 2. The predictive module 118 may also be included as part of an application 114. In general, the components allow all or part of the process of identifying and acquiring predictive information to be taken up by the system 90 itself rather than by a central system.

For example, where a user conducts a web search and the device is set so that the prediction selector indicates that the content of additional web pages is to be pre-fetched, the prediction engine 122 may, upon receiving all or part of the search results, begin issuing messages to the web sites identified in the search result. Alternatively, if the search mode requires follow-up retrieval of information using different search styles, the prediction selector 121 may cause the device not to obtain additional information, because such follow-up work is best conducted by the server site, which can quickly run searches based on the web, news, newsgroups, images, and other styles of searching.

Predictive storage 114 is simply an area of memory in which predictive information may be stored, and then later provided as follow-up information. Predictive storage 114 may be dedicated memory, or may be one or more blocks of memory in a shared memory space. The predictive storage 114 may comprise RAM, Flash memory, ROM, MRAM, or other appropriate memory technologies. As noted above, the predictive storage 114 may be organized in a FIFO manner, so that the oldest existing information is overwritten when the memory is full. The information stored in predictive storage 114 may be accessed by applications 116, such as to provide follow-up information when a user requests it.

Although shown in an implementation in a personal communicator, system 90 may take many other forms. For example, system 90 could be implemented as part of a personal computer, whether networked or unnetworked, and if networked, whether by wire or wirelessly. Also, data entry may occur in different manners, including by complete keyboard, constrained keyboard, or voice command. Also, one or more components may be located remotely from the system 90, such as at a remote server, and the functionality of system 90 may be provided by combining the components or using components other than those shown.

Figure 4:
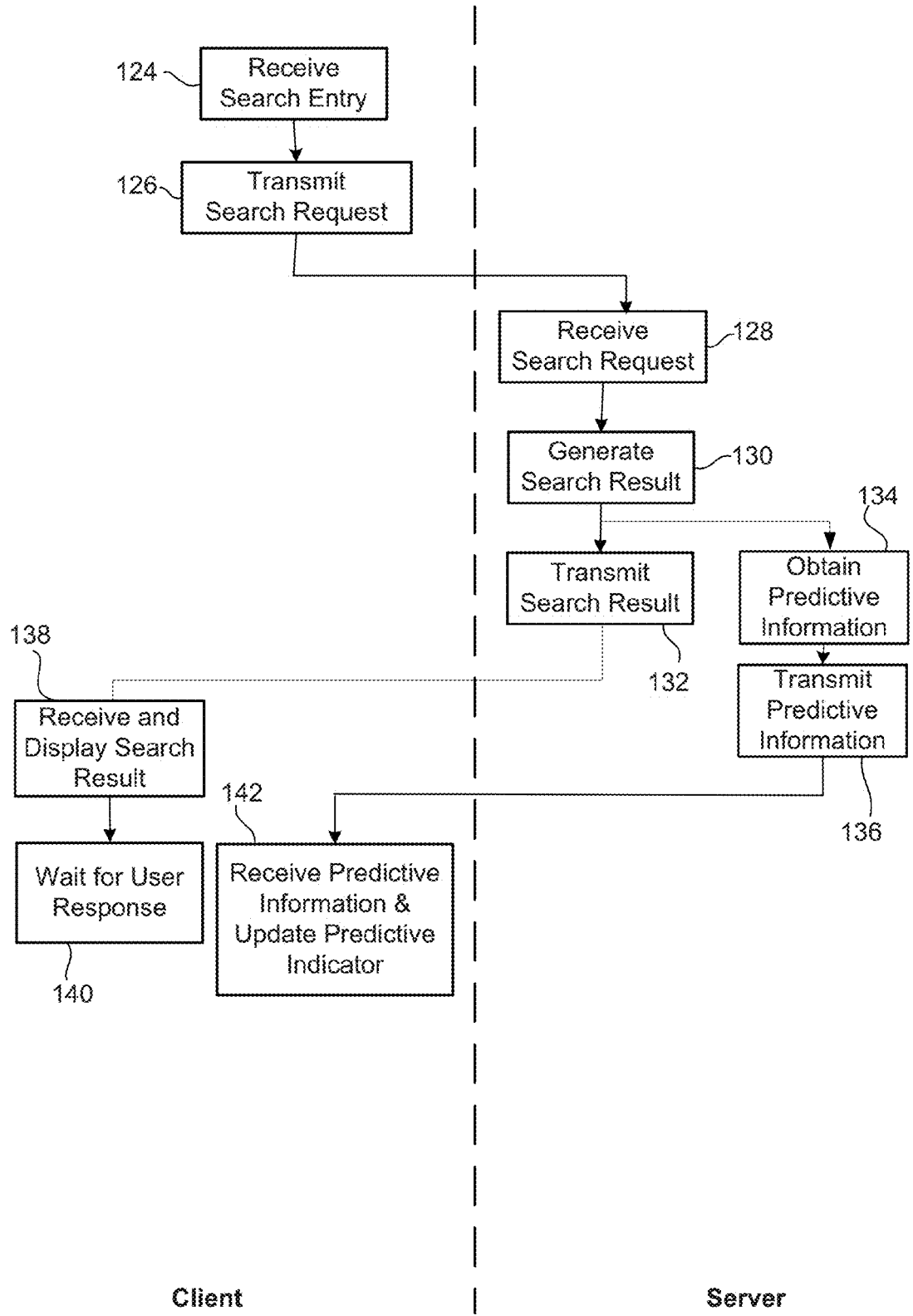
FIG. 4 is a client-server flow chart showing exemplary steps for obtaining predictive information in response to a request.

FIG. 4 is a client-server flow chart showing exemplary steps for obtaining predictive information in response to a request. In general, the chart shows a process by which predictive information is obtained while search results are being transmitted to a user, and by which the predictive information is transmitted while the user is reviewing the search results. The flow chart generally depicts steps that can be performed in parallel as an example of the operation of the process, but the operations could occur in other orders and with other steps as appropriate.

At step 124, a search entry is received at a client device. This search entry could comprise terms for which a web search is desired. The device transmits the search request at step 126, and a central system receives the request at step 128 and generates a search result at step 130. Again, the manner in which the search result is generated may occur in any of a number of appropriate manners, and is not critical to the operation of the process. Once the search result is generated, it can be transmitted by the central system to the remote device (step 132), and be received and displayed on the remote device (step 138).

Also, at or near the same time that the search result is being obtained and/or transmitted, or at least before a user selects a substantial portion of the information represented by the search result, the central system may obtain predictive information (step 134). At this step, all of the relevant predictive information may be obtained (e.g., all parallel search results on newsgroups, images, web blogs, local search, etc. may be performed) and transmitted to the remote device (step 136). Alternatively, part of the predictive information may be obtained, and then transmitted, while other parts of the predictive information are being retrieved.

When the predictive information is received by the remote device, it may be streamed into storage and a predictive indicator may be updated for the user (step 142). For example, the predictive indicator may indicate to the user the progress of the download of potential follow-up information so that the user can keep reviewing the initial information until they see that the follow-up information has been fully received. In general, the predictive information continues to be downloaded to the remote device until the download is complete or until there is an interruption, such as by the presentation, by the user, or another search request.

Figure 5:
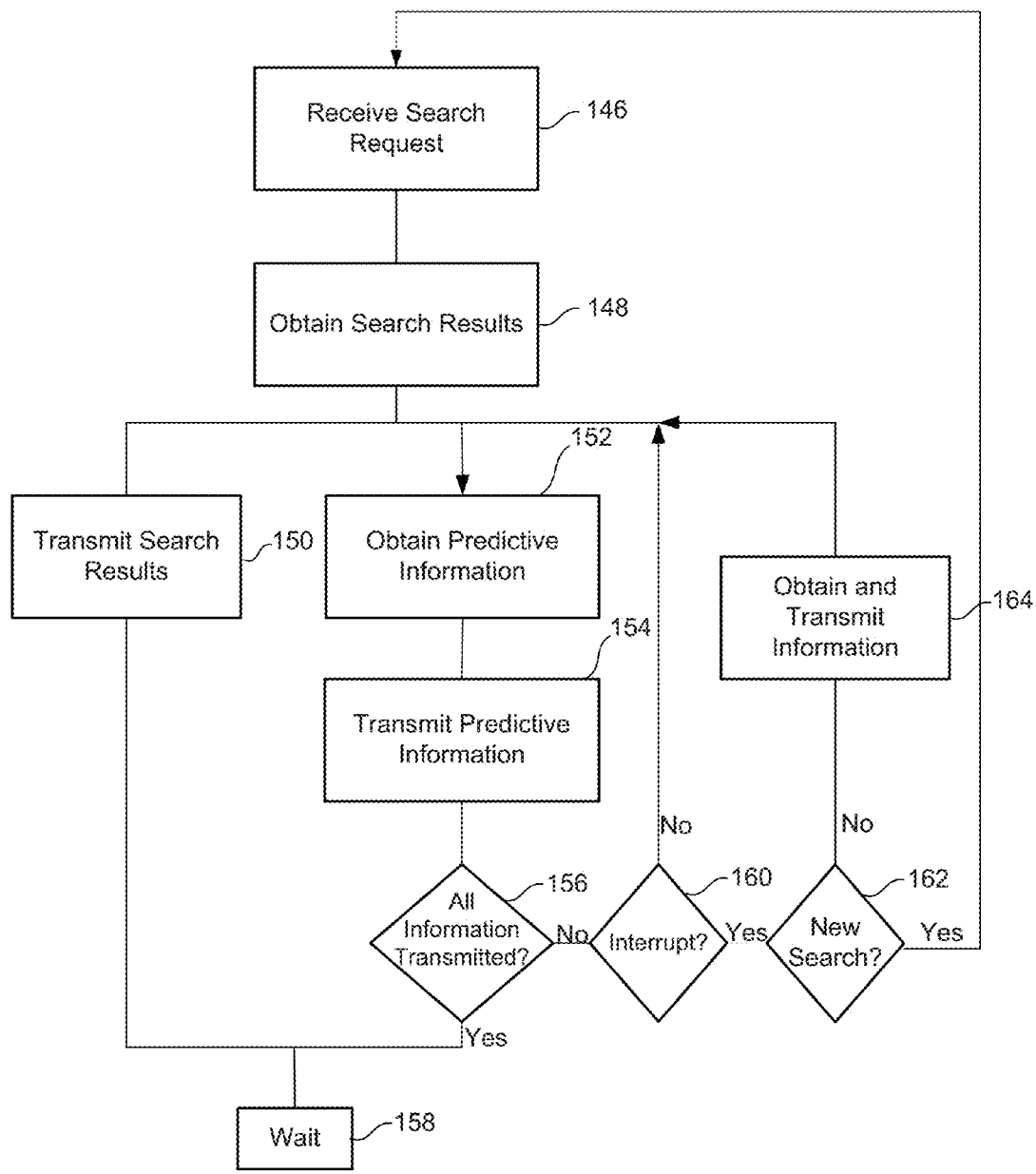
FIG. 5 is a flow chart showing exemplary steps for providing predictive information in response to a request.

FIG. 5 is a flow chart showing exemplary steps for providing predictive information in response to a request. The steps shown may generally be executed by a central server that receives requests, such as search requests, from remote users. At step 146, a search request is received from a user, and search results are obtained responsive to the request at step 148. Simultaneously, or near simultaneously, the system may transmit the results to the user (step 150) and begin obtaining predictive information (step 152). When an appropriate amount of predictive information has been received, the system may begin transmitting the predictive information to the remote device (step 154), such as a part of the search results. The client application may then be configured in such a manner that it can appropriately store and display the information. The client may also make repeated individual requests for information, or the central system may simply transmit the additional information to the same address to which it transmitted the previous information (and the client device may keep "listening" for information). Also, when all identified information has been transmitted (step 156), the system waits (step 158), such as for follow-up actions by the user that generate new demands on the central system.

If all identified information has not yet been transmitted (step 156), and no event has occurred to interrupt the transmission (step 160), then additional predictive information is identified, obtained, and transmitted. If an interruption has occurred (step 160) and that interruption is caused by a new search request (step 162), the process may begin again. If the interruption is not the result of a new search request, such as when the interruption occurs as the result of an attempt to access pre-fetched information, the information may be provided to the user (step 164). Of course, if the requested information has all been pre-fetched, it may simply be transmitted from memory, while if it has not been pre-fetched or fully pre-fetched, it can be obtained in whole or in part in a conventional manner. Once the requested information is downloaded, the system may return to pre-fetch any remaining predictive information.

Figure 6:
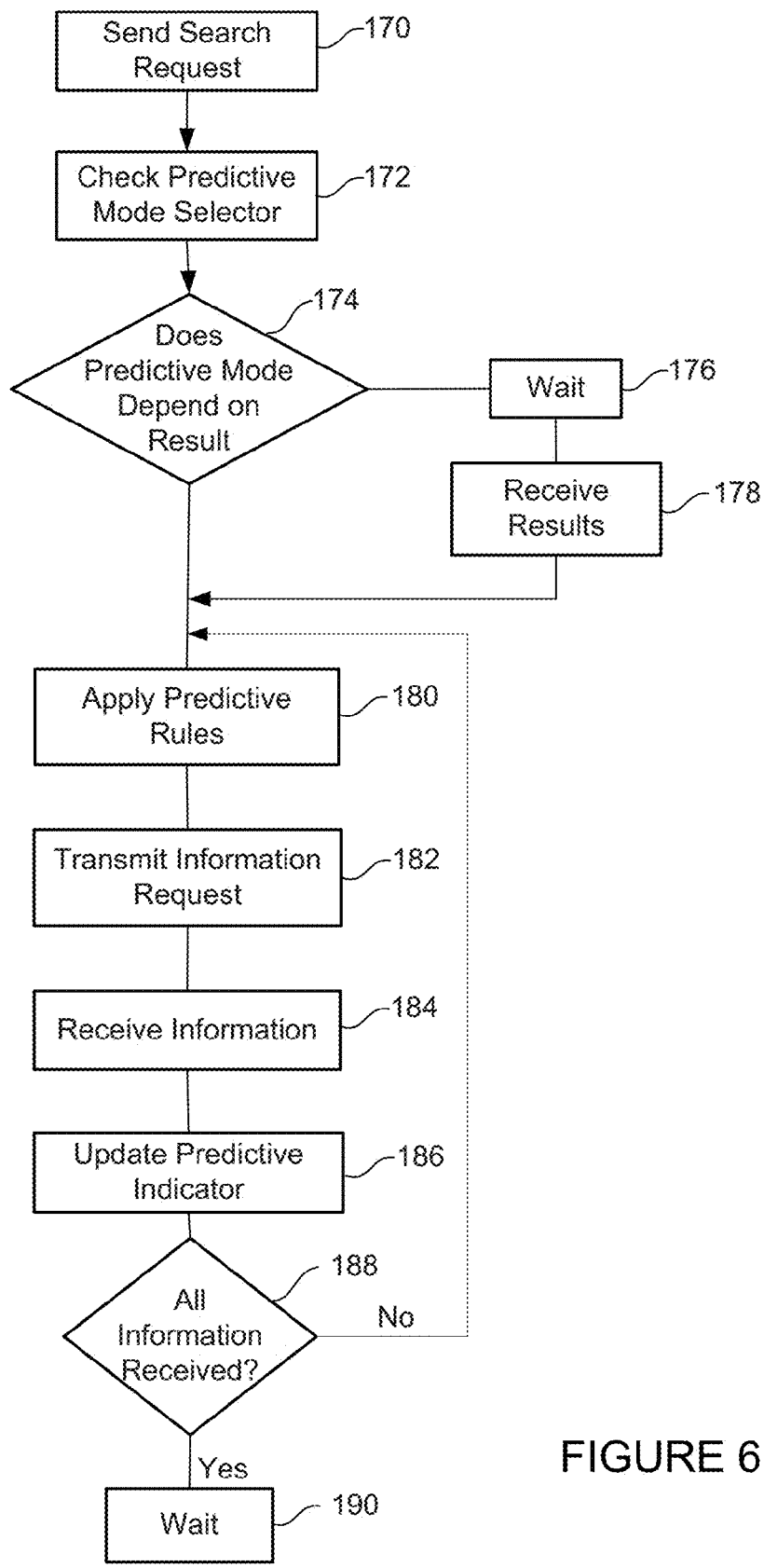
FIG. 6 is a flow chart of exemplary steps for obtaining predictive information relating to a request.

FIG. 6 is a flow chart of exemplary steps for obtaining predictive information relating to a request. In general, these steps may be performed by a remote device from which a user is trying to access information. At step 170, the device sends a search request to a system at another remote site. The device then checks, at step 172, for the predictive mode in which the device is set. If the predictive mode depends on the results returned for the request (step 174), then the device waits for the results (176) and then receives the results (step 178).

The device may then begin gathering predictive information while the results are displayed to the user. In step 180, the device applies the predictive rules to ensure that the identification and gathering of predictive information is in accord with the user's preferences. The device then determines what information is needed, based on application of the initial request or its response, and it transmits an information request to obtain that information (step 182). After waiting for a particular period of time, the information arrives at the device (step 184), and the device may update its predictive indicator (step 186) to show to the user how the download is progressing. If all of the predictive information has been received (step 188), the device may wait for additional input from the user (step 190). If all the information is not received, the device may gather more predictive information.

FIGS. 7a-7c are exemplary screen shots showing the operation of predictive information retrieval apparatuses. FIG. 7a shows an example of a space-constrained display for a search engine offering. In the example display, a search term has been entered and results have been returned in the form of a search result listing. The display also shows tabs providing the options of applying the search request to other search styles. A gauge at the bottom of the display provides a general indication of the amount of predictive information that has been downloaded in the background while the user has reviewed the search results. As shown in the figure, a little less than one-half of the total predictive information has been downloaded. Thus, the user can see that a request for follow-up information might or might not be answered quickly. The gauge may also provide an indication of the amount of remaining memory in the device or allocated for pre-fetched information that has been filled or not been filled.

FIG. 7b shows an exemplary screen shot with more detail, including search results and an advertisement area. The advertisements may be created to be relevant to the user by matching the search request, and may be applied directly by the search service provider as part of the search result, or by a third party such as an advertising aggregator. In this figure, the progress of the background pre-fetching download is shown by the color of the tabs for each of the five pictured search styles: web, images, groups, news, and Froogle. For example, in the figure, the web and news tabs are displayed in their reverse colors, so as to indicate that the predictive information relating to those tabs has been pre-fetched. From this display, the user is immediately notified that they could select the news tab, and the results would be nearly immediately accessible.

FIG. 7c shows a search result display having a predictive indicator area along the left edge of the display. Specifically, the system is configured so that the predictive information to be retrieved includes downloads of web pages from the locations signified by the information in the search results. To aid the user in determining when the predictive information for a particular search result is ready for review, displays of progress for each group of results are shown, here, showing progress from 0% to 100%. In this manner, the user can know, specific to each result, how the gathering of information is progressing. The displays for each search result may also provide a less graduated guide to download status, such as by showing a red dot next to a search result if its corresponding predictive information is not yet downloaded, a green dot when it is downloaded, and perhaps a yellow dot when it is substantially downloaded (such that a user could select the follow-up information and expect the last part of the follow-up information to be downloaded as the follow-up information is displayed, or at least before the user has reached the end of the follow-up information).

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the internet.

The computing system can include clients and servers. A client and server are generally remote from each other and typically interact through a communication network. The relationship of client and server arises by virtue of computer programs running on the respective computers and having a client-server relationship to each other. The client-server relationship need not fit a formal client-server definition, however.

Although a few embodiments have been described in detail above, other modifications are possible. Portions of this disclosure discuss operation though portable devices, but any of a number of devices may be used, including fully-functional general purpose computers. Also, the logic flows depicted in the figures do not require the particular order shown, or sequential order, to achieve desirable results. Also, other steps may be provided, or steps may be eliminated, from the described flows, and other components may be added to, or removed from, the described systems. Other embodiments may be within the scope of the following claims.

What is claimed is:

1. A computer-implemented method, comprising:
   generating, by a computing device, a query based on query input that is received by the computing device;
   transmitting, by the computing device, the query to a computing system;
   receiving, by the computing device and in response to transmitting the query to the computing system:
      (i) a search result that is responsive to the query, and
      (ii) a first portion of information that the computing device is to present in response to selection of the search result;
   displaying, by the computing device and in response to receiving the search result, the search result;
   receiving, by the computing device while the search result is being displayed, a second portion of the information that the computing device is to present in response to selection of the search result;
   receiving, by the computing device, a user selection of the search result; and
   displaying, by the computing device and in response to receiving the user selection of the search result, the first and second portions of the information without the computing device having transmitted a request to the computing system for the information after having received the user selection of the search result.

2. The method of claim 1, wherein displaying the search result includes (i) displaying a hyperlink to a web page that is responsive to the query, and (ii) displaying a description of the web page.

3. The method of claim 1, wherein the computing device does not specifically request the information from the computing system.

4. The method of claim 1, further comprising storing, by the computing device, the information, wherein displaying the information is performed without the computing device issuing a request over the internet for the information.

5. The method of claim 1, wherein generating the query based on the query input and transmitting the query to the computing system occurs in response to user selection of a search button.

6. The method of claim 1, wherein displaying the search result includes displaying the search result in a web page, wherein the web page also displays one or more advertisements.

7. The method of claim 1, wherein the search result is a search result associated with a first search style, the method further comprising:
   receiving, by the computing device and in response to transmitting the query to the computing system, another search result associated with a second search style;
   receiving, by the computing device and after displaying the search result, user input indicating the second search style; and
   displaying, by the computing device and in response to receiving the user input indicating the second search style, the another search result without the computing device having transmitted a request to the computing system for the another search result after having received the user input indicating the second search style.

8. The method of claim 1, further comprising:
   receiving, by the computing device and in response to transmitting the query to the computing system, another search result that is responsive to another query that the computing system identified as being related to the initial query;

receiving, by the computing device and after displaying the search result, user input indicating the another query; and displaying, by the computing device and in response to receiving the user input indicating the another query, the another search result without the computing device having transmitted a request to the computing system for the another search result after having received the user input indicating the another query.

9. A computer-implemented method, comprising:

generating, by a computing device, a query based on query input that is received by the computing device;

transmitting, by the computing device, the query to a computing system;

receiving, by the computing device and in response to transmitting the query to the computing system:
  (i) a search result that is responsive to the query, and
  (ii) information that the computing device is to present in response to selection of the search result;

displaying, by the computing device and in response to receiving the search result and the information, the search result;

receiving, by the computing device, a user selection of the search result;

displaying, by the computing device and in response to receiving the user selection of the search result, the information without the computing device having transmitted a request to the computing system for the information after having received the user selection of the search result; and presenting, by the computing device, the search result in a web page, wherein the web page also displays a user interface element that indicates that the information is only partially downloaded by the computing device.

10. A non-transitory computer storage medium encoded with a computer program, the program comprising instructions that when executed by data processing apparatus cause the data processing apparatus to perform operations comprising:

generating, by a computing device, a query based on query input that is received by the computing device;

transmitting, by the computing device, the query to a computing system;

receiving, by the computing device and in response to transmitting the query to the computing system:
  (i) a search result that is responsive to the query, and
  (ii) a first portion of information that the computing device is to present in response to selection of the search result;

displaying, by the computing device and in response to receiving the search result, the search result;

receiving, by the computing device while the search result is being displayed, a second portion of the information that the computing device is to present in response to selection of the search result;

receiving, by the computing device, a user selection of the search result; and displaying, by the computing device and in response to receiving the user selection of the search result, the first and second portions of the information without the computing device having transmitted a request to the computing system for the information after having received the user selection of the search result.

11. The non-transitory computer storage medium of claim 10, wherein displaying the search result includes (i) displaying a hyperlink to a web page that is responsive to the query, and (ii) displaying a description of the web page.

12. The non-transitory computer storage medium of claim 10, wherein the computing device does not specifically request the information from the computing system.

13. The non-transitory computer storage medium of claim 10, the operations further comprising storing, by the computing device, the information, wherein displaying the information is performed without the computing device issuing a request over the internet for the information.

14. The non-transitory computer storage medium of claim 10, wherein generating the query based on the query input and transmitting the query to the computing system occurs in response to user selection of a search button.

15. The non-transitory computer storage medium of claim 10, wherein displaying the search result includes displaying the search result in a web page, wherein the web page also displays one or more advertisements.

16. The non-transitory computer storage medium of claim 10, the operations further comprising presenting, by the computing device, the search result in a web page, wherein the web page also displays a user interface element that indicates that the information is only partially downloaded by the computing device.

17. A computing device comprising:

a display screen;

a communications module for transmitting communications;

a memory encoded with a computer program, the program comprising instructions that, when executed by the computing device, cause the computing device to perform operations comprising:

generating a query based on query input that is received by the computing device;

transmitting, using the communications module, the query to a computing system;

receiving, in response to transmitting the query to the computing system:
  (i) a search result that is responsive to the query, and
  (ii) a first portion of information that the computing device is to present in response to selection of the search result;

displaying, by the computing device and in response to receiving the search result, the search result;

receiving, by the computing device while the search result is being while displayed, a second portion of the information that the computing device is to present in response to selection of the search result;

receiving a user selection of the search result; and displaying, by the computing device and in response to receiving the user selection of the search result, the first and second portions of the information without the computing device having transmitted a request to the computing system for the information after having received the user selection of the search result.

18. The computing device of claim 17, wherein displaying the search result includes (i) displaying a hyperlink to a web page that is responsive to the query, and (ii) displaying a description of the web page.

19. A computer-implemented method, comprising:

generating, by a computing device, a query based on query input that is received by the computing device;

transmitting, by the computing device, the query to a computing system;

receiving, by the computing device and in response to transmitting the query to the computing system:
- (i) a first search result that is responsive to the query,
- (ii) first information that the computing device is to present in response to selection of the first search result;
- (iii) a second search result that is responsive to the query, and
- (iv) second information that the computing device is to present in response to selection of the second search result;

displaying, by the computing device and in response to receiving the first search result and the second search result, the first search result and the second search result together;

receiving, by the computing device, a user selection of the first search result;

displaying, by the computing device and in response to receiving the user selection of the first search result, the first information without the computing device having transmitted a request to the computing system for the first information after having received the user selection of the search result;

receiving, by the computing device, additional query input; and in response to receiving the additional query input, deleting the second information from the memory of the computing device.

* * * * *